(12) United States Patent
Yanagihara et al.

(10) Patent No.: US 6,173,114 B1
(45) Date of Patent: Jan. 9, 2001

(54) REPRODUCTION APPARATUS AND METHOD WHICH PREVENTS DATA OVERFLOW AND UNDERFLOW

(75) Inventors: Naofumi Yanagihara, Tokyo; Mari Horiguchi, Kanagawa, both of (JP)

(73) Assignee: Sony Corporation, Tokyo (JP)

( * ) Notice: Under 35 U.S.C. 154(b), the term of this patent shall be extended for 0 days.

(21) Appl. No.: 08/926,165

(22) Filed: Sep. 9, 1997

(30) Foreign Application Priority Data

Sep. 10, 1996 (JP) .................................................. 8-238781

(51) Int. Cl.[7] .................................................. H04N 5/917
(52) U.S. Cl. .......................... 386/109; 386/125; 386/95; 369/48
(58) Field of Search .................................... 386/125, 109, 386/95, 126, 98, 111, 112; 369/48; 360/26; 375/240.28; H04N 5/917

(56) References Cited

U.S. PATENT DOCUMENTS

| | | | |
|---|---|---|---|
| 5,243,587 | * | 9/1993 | Itoh et al. ............................. 369/48 |
| 5,758,007 | * | 5/1998 | Kitamura et al. ..................... 386/109 |
| 5,901,149 | * | 5/1999 | Itakura et al. ........................ 386/109 |
| 5,930,450 | * | 7/1999 | Fujita ..................................... 386/95 |
| 5,930,451 | * | 7/1999 | Ejiri ..................................... 386/111 |
| 5,949,955 | * | 9/1999 | Nakai ................................... 386/126 |
| 5,953,483 | * | 9/1999 | Van Gestel et al. ................. 386/112 |
| 5,963,704 | * | 10/1999 | Mimura et al. ........................ 386/95 |
| 5,987,214 | * | 11/1999 | Iwamura ............................... 386/125 |
| 6,009,234 | * | 12/1999 | Taira et al. ............................. 386/95 |

* cited by examiner

*Primary Examiner*—Wendy Garber
*Assistant Examiner*—Vincent F. Boccio
(74) *Attorney, Agent, or Firm*—Frommer Lawrence & Haug, LLP; William S. Frommer; Gordon Kessler

(57) ABSTRACT

A reproducing apparatus is provided which can reproduce data for decoding without overflowing or underflowing the decoder. Time information contained in the reproduced data is extracted, compared to a reference time and, depending upon such comparison, the reproduction and temporary holding of such data is controlled. Timing of the writing and reading of a temporary storage device (e.g. a FIFO buffer) and timing of the decoder are resettable simultaneously if discontinuous data are reproduced.

12 Claims, 7 Drawing Sheets

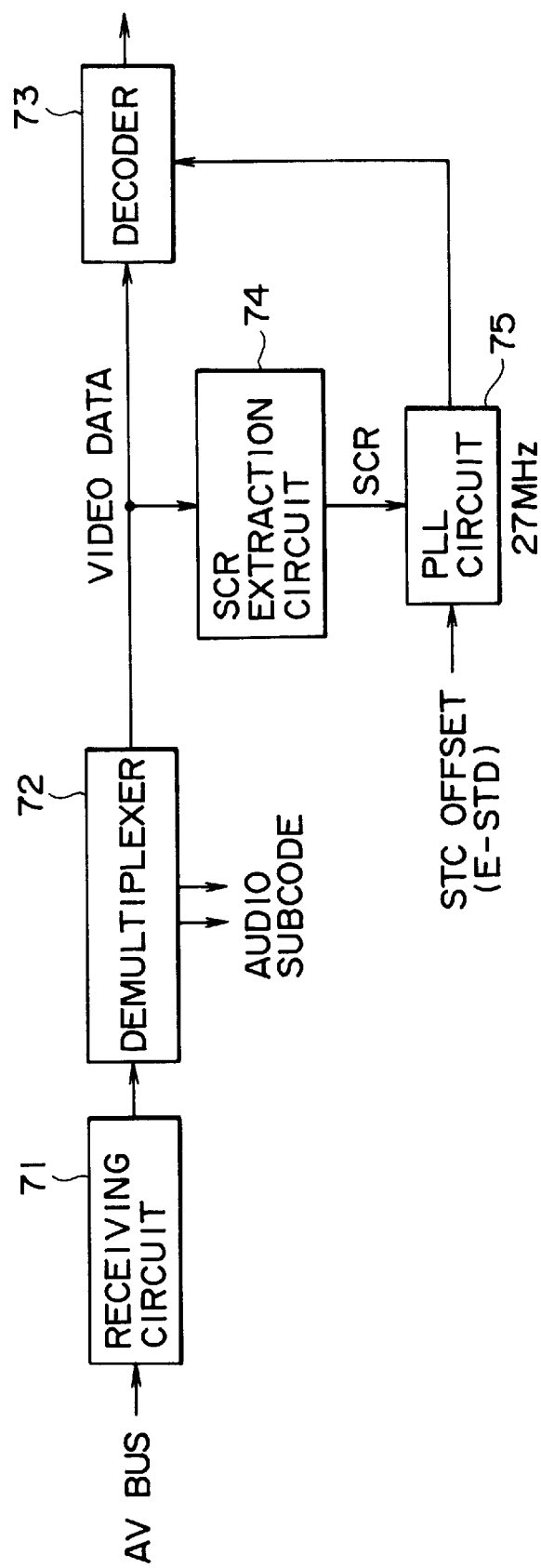

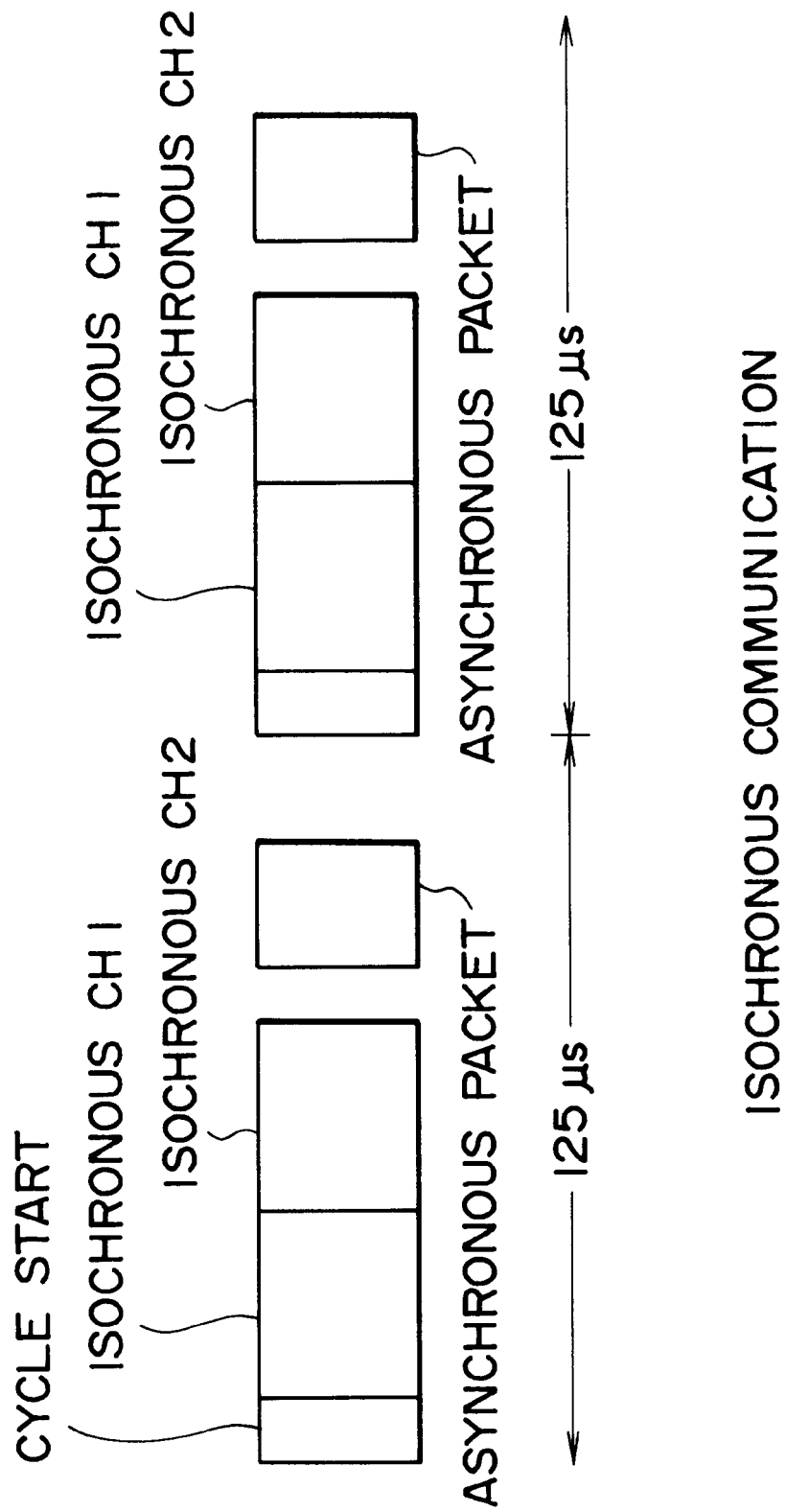

REPRODUCTION APPARATUS AND METHOD WHICH PREVENTS DATA OVERFLOW AND UNDERFLOW

BACKGROUND OF THE INVENTION

This invention relates to a device and method for reproducing data from recording media, and particularly relates to such a device and method which prevents data from overflowing or underflowing a decoder.

Recently, DVD (Digital Versatile Disc)-Video (referred to as simply DVD hereinafter) has been standardized, and it is expected to become extremely popular. Video data compressed by way of the MPEG (Moving Picture Expert Group) technique is recorded on a DVD. A DVD player reproduces data from the disc, decodes that data in the decoder section, and outputs it to a television for display.

If the television has decoding capabilities, the DVD player may be connected thereto via an audio-video (AV) bus, and the DVD player outputs an encoded bit stream via the AV bus to the television for decoding.

However, when data are transmitted through the AV bus from the DVD player to a television having decoding capabilities, the television decoder can overflow or underflow depending on the condition of the AV bus because there will be no overflow/underflow condition fed back from the television to the DVD player.

OBJECTS OF THE INVENTION

Therefore, it is an object of the present invention to provide an apparatus which overcomes the shortcomings of the above-discussed apparatus.

Another object of the present invention is to prevent a decoding device, such as a television having decoding capabilities, from overflowing and underflowing.

Various other objects, advantages and features of the present invention will become readily apparent from the ensuing detailed description and the novel features will be particularly pointed out in the appended claims.

SUMMARY OF THE INVENTION

In accordance with this invention, a reproducing device reproduces encoded data from a recording medium and a storage device temporarily holds the reproduced data. An extractor extracts the time information contained in the data, which is compared with a reference time. A controller controls the storage device and reproducing device in accordance with the result of comparison, and the data held by the storage device is applied to a transmission line.

In accordance with an aspect of this invention, the apparatus includes a reset device for resetting the reference time to correctly reproduce discontinuous data.

BRIEF DESCRIPTION OF THE DRAWINGS

The following detailed description, given by way of example, and not intended to limit the present invention solely thereto, will best be understood in conjunction with the accompanying drawings in which:

FIG. 7 is a block diagram illustrating a structural example of the decoder section of the DVD player shown in FIG. 2; and FIG. 8 is a diagram illustrating isochronous communication.

DETAILED DESCRIPTION OF THE PREFERRED EMBODIMENTS

Figure 1:
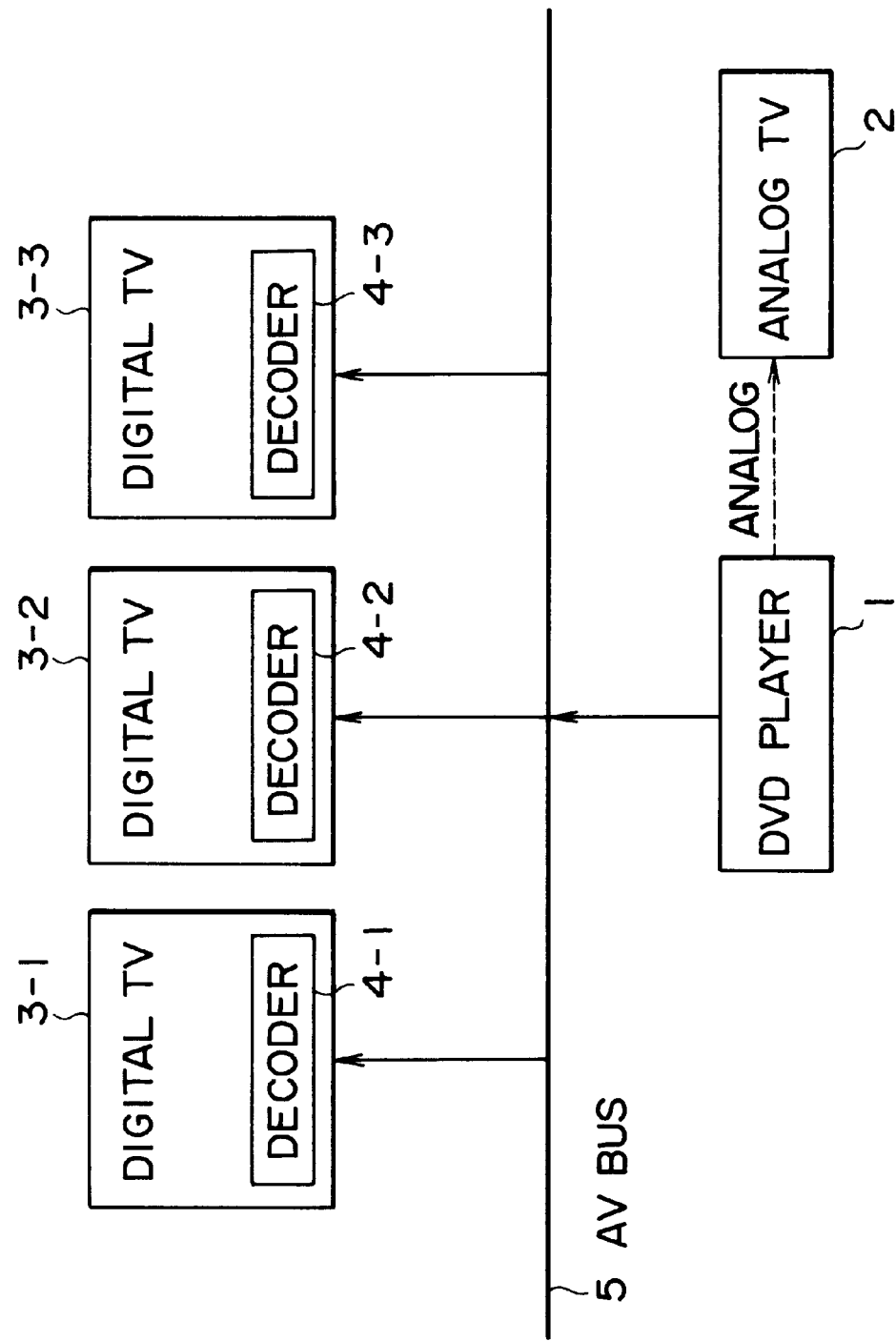
FIG. 1 is a block diagram illustrating an example of an AV system to which the reproduction device of the present invention finds ready application.

FIG. 1 shows a structural example of an AV system which incorporates the reproducing device of the present invention. In this example, a DVD player 1 reproduces a video signal from a DVD and supplies that video signal in analog form to an analog television 2. A plurality of (three televisions in this embodiment) digital televisions 3-1 to 3-3 are connected to the DVD player 1 through an AV bus 5. Each digital television 3-1 to 3-3 has a built-in decoder section 4-1 to 4-3, respectively, for decoding the encoded data transmitted from the DVD player 1 via the AV bus 5 and for supplying the decoded data to a respective digital television 3-1 to 3-3 for display.

The AV bus 5 may be a digital interface such as IEEE (Institute of Electrical and Electronics Engineers) 1394 High is Performance Serial Bus standard (referred to hereinafter simply as a 1394 protocol).

Figure 2:
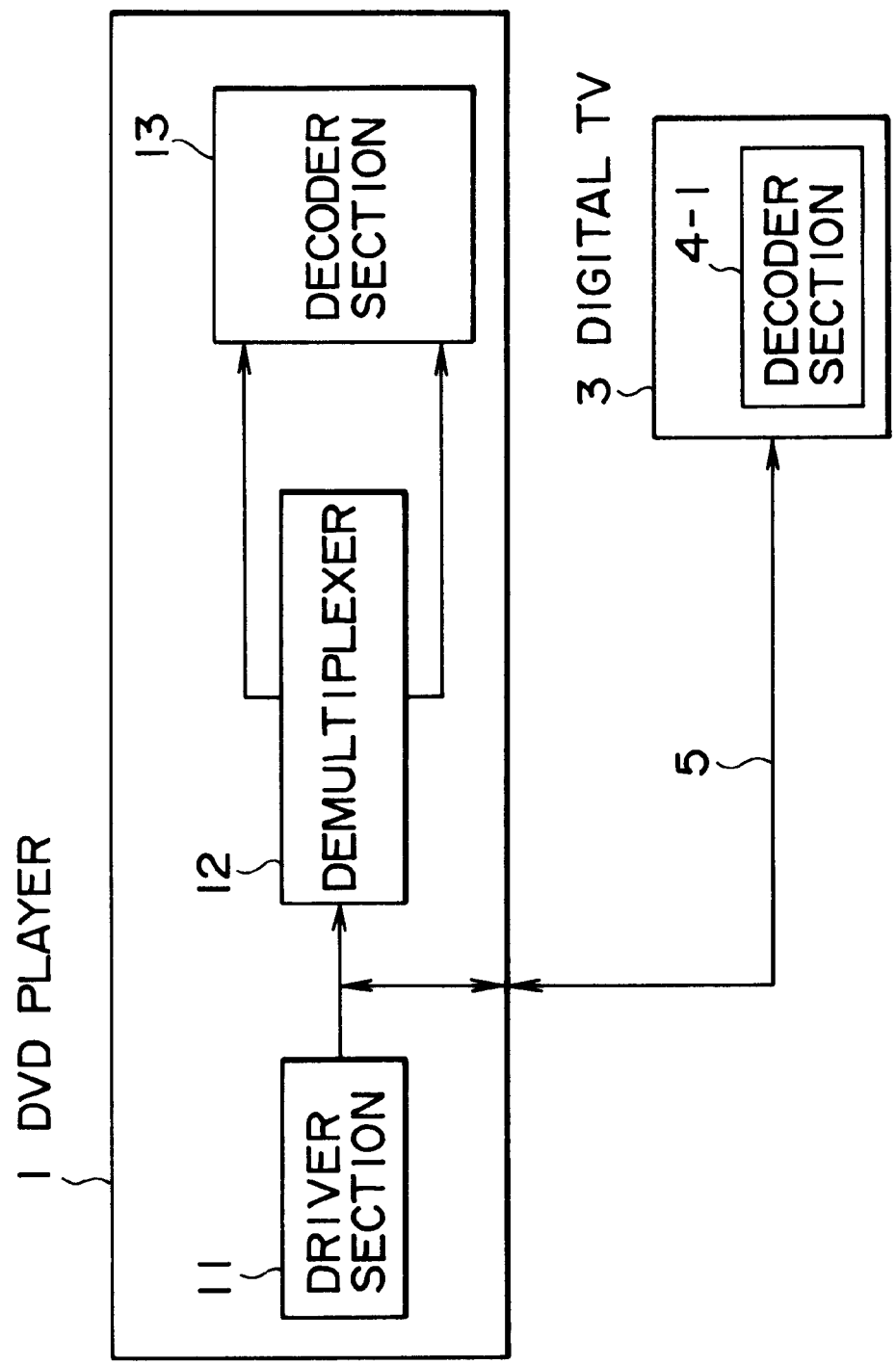
FIG. 2 is a block diagram illustrating a structural example of the DVD player shown in FIG. 1.

FIG. 2 shows an example of the internal structure of the DVD player 1. The DVD player 1 includes a driver section 11, a demultiplexer 12 and a decoder section 13. The driver section 11 reproduces data from the disc and outputs the data to the demultiplexer 12 whereat the data is separated into audio data, video data, and sub-picture data. The decoder section 13 includes three built-in decoders for decoding the audio data, video data, and sub-picture data independently. The data decoded by the decoder section 13 is D/A converted by a D/A converter (not shown) and supplied to the analog television 2 (FIG. 1).

The multiplexed output data from the driver section 11 is supplied to the digital televisions, 3-1, 3-2 and 3-3 via the AV bus 5.

Figure 3:
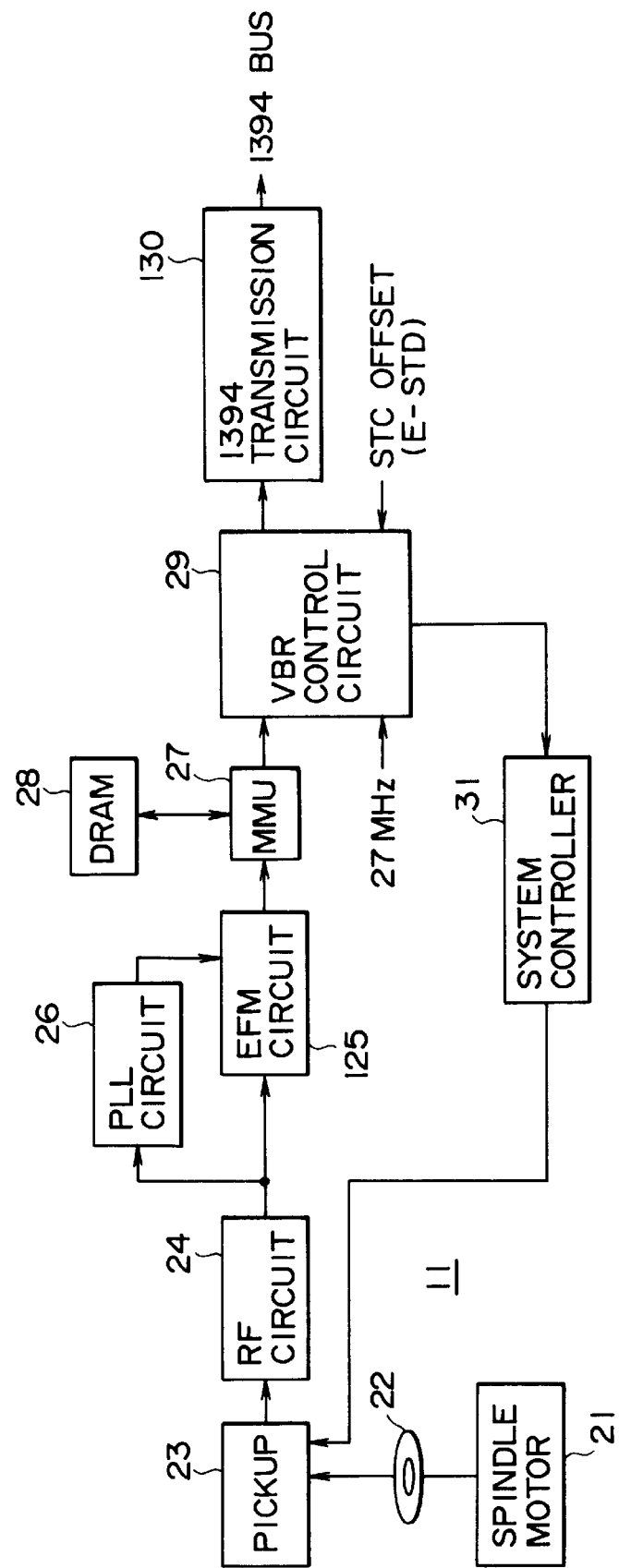
FIG. 3 is a block diagram illustrating a structural example of the drive section of the DVD player shown in FIG. 2.

FIG. 3 shows a structural example of the driver section 11. A spindle motor 21 drives a disc 22 (recording medium) at a prescribed speed. A pickup 23 irradiates a laser beam onto the disc 22 to reproduce the data recorded therein. An output from the pickup 23 is supplied to a RF circuit 24, in which the RF signal is amplified and equalized to prescribed characteristics, supplied to an EFM+ circuit 25 and a PLL circuit 26. The PLL circuit 26 extracts a clock component from the reproduced data, and outputs the clock component to the EFM+ circuit 25 for demodulating the data supplied from the RF circuit 24.

The output from the EFM+ circuit 25 is supplied to a memory management unit (MMU) 27 for storage in a DRAM 28 (Dynamic Random Access Memory). Also, the MMU 27 performs error detection correction processing (ECC processing) and samples the data stored in the DRAM 28 for information required for system control processing.

The output data from the MMU 27 is supplied to a VBR (Variable Bit Rate) control circuit 29 which controls the timing of the data. The time controlled data is supplied to a 1394 transmission circuit 30 which converts the data to the 1394 format, and transmits the converted data to the AV bus 5.

The VBR control circuit 29 generates a control signal as a function of the difference between the data quantity received from the MMU 27 and the data quantity supplied to the 1394 transmission circuit 30. The VBR control circuit 29 supplies a control signal to a system controller 31 for controlling access to the disc 22 by the pickup 23.

Figure 4:
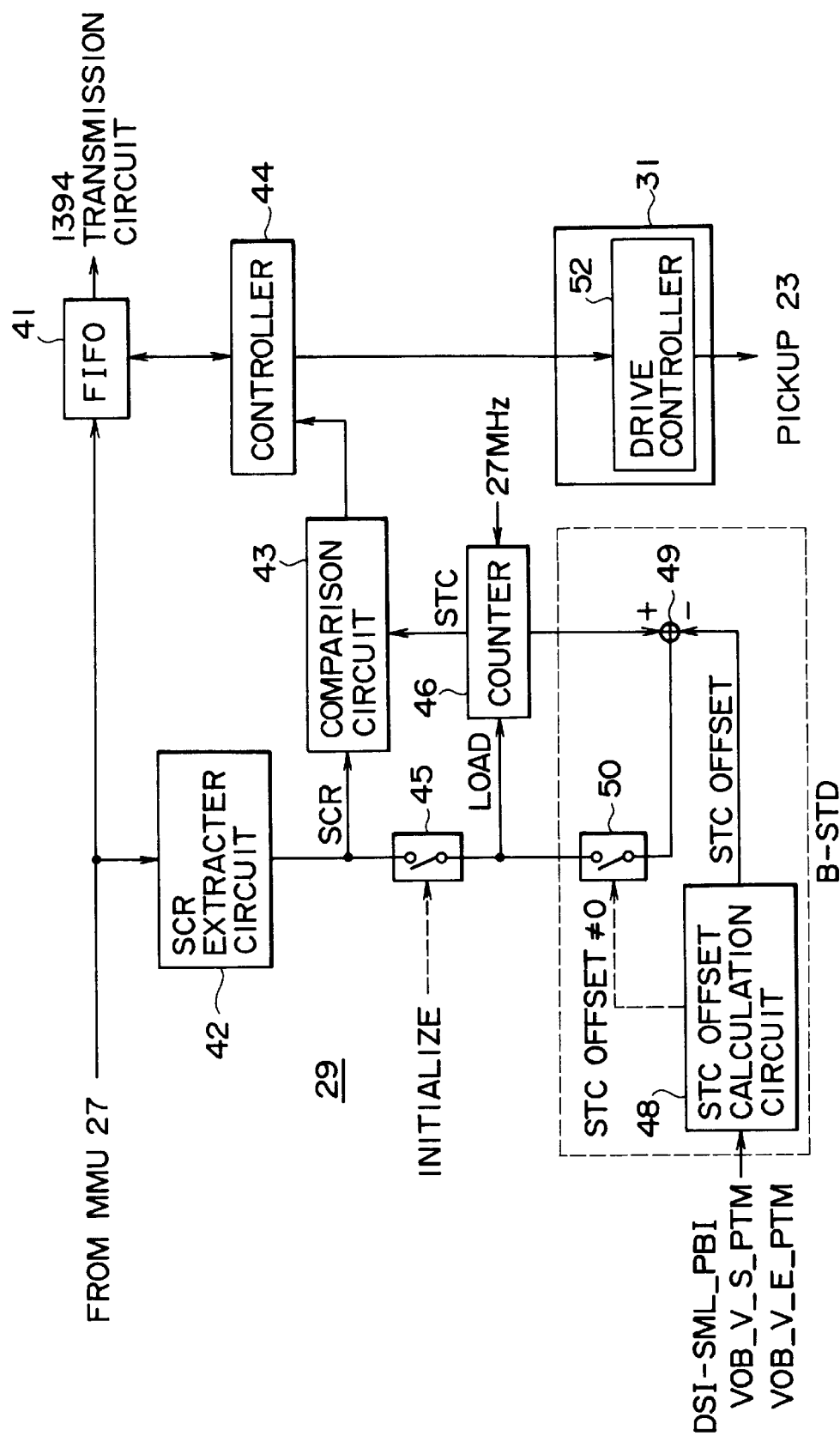
FIG. 4 is a block diagram illustrating a structural example of the variable bit rate control circuit shown in FIG. 3.

FIG. 4 shows a structural example of the VBR control circuit 29. The output data from the MMU 27 is supplied to the 1394 transmission circuit 30 via a FIFO (First In First Out) buffer 41. The output data from the MMU 27 is also supplied to a system clock reference (SCR) extraction circuit 42, which extracts the system clock reference (SCR) contained in such data (time information). The extracted SCR is supplied to a comparison circuit 43 and, via switch 45, to a counter 46.

The comparison circuit 43 compares the system time clock (STC) (standard time) produced by the counter 46 to the SCR received from the SCR extraction circuit 42, and outputs the comparison result to a controller 44.

The controller 44 controls the FIFO 41 in accordance with the comparison result determined by the comparison circuit 43, and also detects the quantity of data in the FIFO 41. The controller 44 supplies a control signal corresponding to the detected data quantity to a drive controller 52 which, in turn, controls the pickup 23 (FIG. 3) in accordance with that control signal.

A reset circuit 47 includes a STC offset calculation circuit 48, a subtractor 49 and a switch 50. The STC offset calculation circuit 48 calculates the STC offset from Video Object_Video_Start_Presentation Time (VOB_V_S_PTM) and Video Object_Video_End_Presentation Time VOB_V_E_PTM contained in Data Search Information$_{13}$ Seamless_Playback Information DSI_SML_PBI reproduced by the DVD player (FIG. 3). The STC offset calculation circuit 48 supplies the calculation result to the subtractor 49 which subtracts the STC offset from the value of the counter 46, and supplies the subtraction result to the counter through the switch 50. The switch 50 is operable by the STC offset circuit 48 and turns on if the STC offset is not zero.

Upon receiving a command from the DVD player 1 to reproduce the disc 22, the spindle motor 21 rotates the disc at a predetermined speed. The pickup 23 accesses a prescribed track of the disc 22 and reproduces the data recorded therein. This reproduced signal is supplied to the RF circuit 24 which amplifies and equalizes the reproduced signal; and the RF circuit supplies the amplified and equalized signal to the EFM+ circuit 25 and PLL circuit 26. The PLL circuit 26 generates the clock component from the received signal and supplies the generated clock component to the EFM+ circuit 25 which demodulates the amplified and equalized signal in accordance with such clock component. The demodulated data is supplied to the MMU 27.

The MMU 27 stores in DRAM 28 the demodulated data received from the EFM+ circuit. The MMU 27 also performs error correction processing on the data stored in the DRAM and the resultant error-corrected data is stored in the FIFO 41 of the VBR control circuit 29.

In the VBR control circuit 29, the SCR extraction circuit 42 extracts the SCR from the data received from the MMU 27. Immediately after starting the reproduction process of the disc 22, initialization processing is performed and the switch 45 is turned on. The SCR extracted by the SCR extraction circuit 42 is loaded into the counter 46 through the switch 45 and the counter counts the system clock having a frequency of 27 MHz. The counter generates the STC as the reference time and supplies the STC to the comparison circuit 43 which compares the STC received from the counter to the SCR received from the SCR extraction circuit. The comparison result is supplied to the controller 44.

Figure 5:
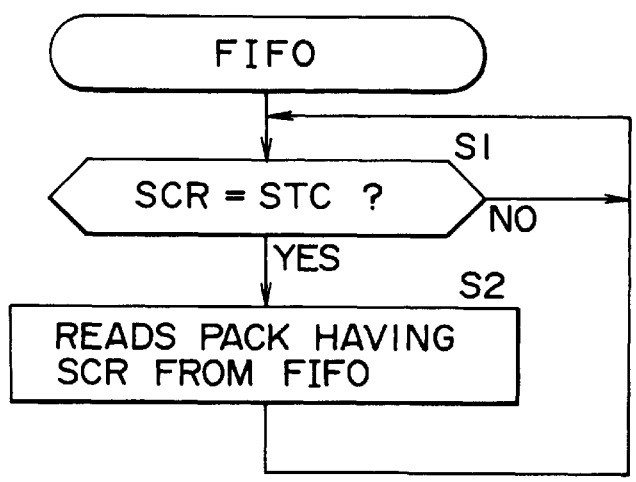
FIG. 5 is a flow chart to which reference will be made in describing the operation of the FIFO in FIG. 4.

The operation of the controller 44 will be described in conjunction with the flow chart of FIG. 5. In step S1, an inquiry is made as to whether the SCR is equal to the STC. If the SCR extracted from the reproduced data is determined to be equal to the STC, the routine proceeds to step S2 whereat the controller 44 reads a pack having the SCR from the FIFO 41 and permits the FIFO 41 to supply the pack data to the 1394 transmission circuit 30. The 1394 transmission circuit converts the data received from the FIFO 41 to the 1394 format, and supplies the formatted data to each decoder 4-1 to 4-3 of the respective digital televisions 3-1 to 3-3 via the AV bus 5.

The comparison processing of step S1 accounts for the transmission time on the AV Bus 5 by comparing the STC to the SCR minus the transmission time.

Figure 6:
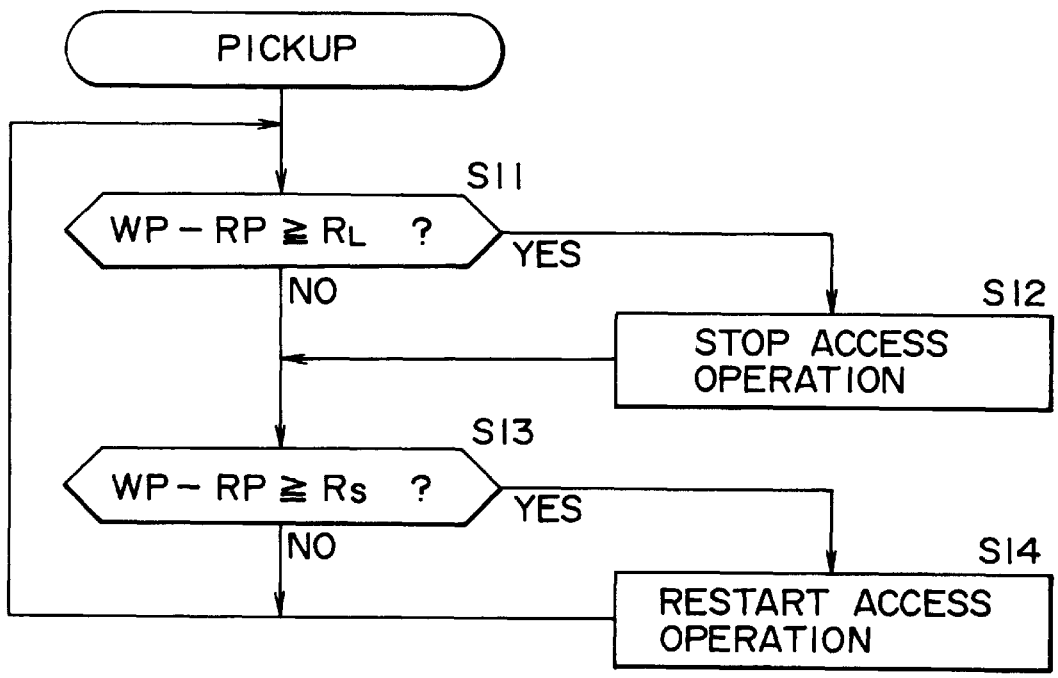
FIG. 6 is a flow chart to which reference will be made in describing the operation of the pickup in FIG. 3.

The controller 44 executes the processing steps shown in the flow chart of FIG. 6 in accordance with the data quantity of the FIFO 41. In step S11, an inquiry is made as to whether the difference between the write pointer WP, which indicates the writing position of the FIFO 41, and the read pointer RP, which indicates the reading position of the FIFO, is equal to or larger than a first reference value $R_L$ (e.g., an empirically determined value). If the difference between WP and RP is larger than $R_L$, the FIFO 41 may overflow and the controller 44 outputs a control signal to the drive controller 52 to temporarily stop the access (reproduction operation) of the disc 22 by the pickup 23, as represented by step S12. This prevents the FIFO 41 from overflowing.

If in step S11 the difference is determined to be smaller than the reference value $R_L$, or if the "stop access" processing of step S12 is executed, the routine proceeds to step S13. Here, the controller 44 determines whether the difference between WP and RP is equal to or smaller than a second reference value $R_S$ (which also may be an empirically determined value). If the difference between WP and RP is equal to or smaller than the second reference value $R_S$, the FIFO 41 may underflow and the routine proceeds to step S14 whereat the controller outputs a control signal to the drive controller 52 to restart the access operation which may have been temporarily stopped in step S12, thereby, preventing the FIFO 41 from underflowing.

If the difference between WP and RP is determined to be larger than the reference value $R_S$ in step S13, or after completing the restart operation of step S14, the routine returns to step S11, and the steps S11–S14 are repeated.

Since the controller 44 performs the above-noted control operations to prevent the FIFO 41 from overflowing or underflowing, the decoder sections 4-1, 4-2, and 4-3 of the digital televisions 3-1, 3-2 and 3-3, respectively, are also prevented from overflowing or underflowing. Each decoder section 4-1, 4-2 and 4-3 may decode (access) the data immediately after the data is transmitted thereto on the AV bus 5.

The STC offset calculation circuit 48 of the reset circuit 47 calculates the STC offset required for so-called seamless reproduction. VOB_V_S_PTM represents the presentation (display) starting time of the first video frame of the first GOP (Group of Pictures) in the Video Object (VOB), and VOB_V_E_PTM represents the presentation (display) ending time of the final video frame of the final GOP in the VOB. If the STC of the pack to be decoded is continuous in time, i.e., the VOB_V_E_PTM of the preceding pack is equal to the VOB_V_S_PTM of the next-following pack, the difference between the two packs (STC offset) is zero. On the other hand, if the STC of the two packs to be decoded is discontinuous in time, the difference between the two pack is not zero and the two packs will be decoded incorrectly unless the STC is reset.

The STC offset calculation circuit 48 supplies the calculated STC offset to the subtraction circuit 49 which subtracts the calculated STC offset from the count value (STC) of the counter 46. The switch 50 is turned on if the STC offset is not zero, and the subtraction result of the subtraction circuit 49 is loaded into the counter 46 through the switch 50, thus completing the resetting process. For example, if a picture with an arbitrary angle is selected from a stream composed of a plurality of pictures with different angles subsequent to a prescribed picture and then the picture is reproduced, a continuous (seamless) picture is obtained.

The resetting operation is also performed independently in the decoder sections 4-1, 4-2 and 4-3, which will be described hereinafter with respect to FIG. 7. The driver section 11 of the DVD player 1 performs the resetting operation simultaneously with the decoder sections 4-1, 4-2 and 4-3.

FIG. 7 is a block diagram of the decoder section 4-1, which is identical in structure to the decoder sections 4-2 and 4-3. For simplicity, only the decoder section 4-1 is described herein.

A receiving circuit 71, operable in accordance with the IEEE 1394 protocol, of the decoder section 4-1 removes the packet header from the data received from the AV bus 5 to return the received data to its original data format. The receiving circuit 71 supplies the reformatted data to a demultiplexer 72 which separates the data into audio data, video data, and sub-picture data. For example, the demultiplexer 72 supplies the video data to a decoder 73 and to a SCR extraction circuit 74. The SCR extraction circuit 74 extracts the SCR from the video data, and supplies the SCR to a PLL circuit 75 which generates a clock signal having a frequency of, for example, 27 MHz which is synchronous with the input SCR and supplies the clock signal to the decoder 73. The decoder 73 decodes the video data in accordance with the clock signal supplied from the PLL circuit 75. The decoded video data is subjected to D/A conversion (not shown) and thereafter supplied to the CRT of the corresponding digital television (e.g. digital TV 3-1).

It is appreciated that although FIG. 7 depicts the system for processing only the video data, the decoder section includes similar systems for decoding the audio data and the sub-picture data.

Thus, it is seen that the 1394 transmission circuit 30 of the driver section 11 (FIG. 3) transmits data to the 1394 receiving circuit 71 of the decoder section 4-1 via the AV bus 5; and the 1394 receiving circuit removes the packet header, and supplies the resultant data to the demultiplexer 72. The demultiplexer 72 separates the audio data, video data, and sub-picture data; and the SCR extraction circuit 74 extracts the SCR from the video data, and supplies same to the PLL circuit 75 which generates the clock signal synchronous with the input SCR for the decoder 73 whereat the video data is decoded.

Also, the PLL circuit 75 performs the reset operation in response to the STC offset received from an STC offset calculation circuit (not shown), similar to STC offset calculation circuit 48 of FIG. 4. The PLL circuit 75 and the reset circuit 47 (FIG. 4) simultaneously perform reset operations.

The 1394 protocol supports isochronous communication and asynchronous communication. Isochronous communication generally is used for information data and asynchronous communication generally is used for control data. FIG. 8 schematically shows isochronous communication in which one of the AV apparatuses connected to the bus 5 is selected for transmission. The respective AV apparatuses performing isochronous communication are allotted a specific time zone in respective cycle start packets having a period of 125 $\mu$s. For example, data are transmitted as isochronous Ch1 or isochronous Ch2 in the allocated time zone. As described hereinabove, communication is performed at a certain time interval in isochronous communication.

On the other hand, asynchronous communication is performed in a separate time zone where no isochronous communication is performed. The period of the asynchronous communication time zone is not necessarily constant.

While the present invention has been particularly shown and described with reference to a preferred embodiment, it will be readily appreciated that various changes may be made without departing from the spirit and scope of the invention. For example, Program Clock Reference (PCR) may be used as the time information instead of the System Clock Reference (SCR). It is appreciated that any relevant time information may be used as long as it can be included in the data in a sufficiently short time interval.

Although, a DVD is described herein as the recording medium, the present invention can be used with other recording media; and the AV bus is not necessarily restricted to the IEEE 1394 protocol.

What is claimed:

1. Apparatus for reproducing encoded data from a recording medium and transmitting the reproduced data to a decoder for decoding, comprising:

a reproducer for reproducing a plurality of data portions from said recording medium to provide said reproduced data;

an extractor means for extracting time information contained in said reproduced data, said time information including at least a start time and an end time for each of said reproduced data portions;

a reference time generator for generating a reference time;

a first comparator for comparing said extracted time information to said reference time to generate a comparison result;

a second comparator for comparing an end time of one of said plurality of reproduced data portions and a start time of a next consecutive one of said plurality of said reproduced data portions;

a reset device for resetting said reference time when said second comparator determines that said end time of said one of said plurality of reproduced data portions is not equal to said start time of said next consecutive one of said plurality of reproduced data portions;

a storage device for temporarily holding said reproduced data prior to transmission;

a controller for controlling said storage device and said reproducer in accordance with said comparison result; and a transmitter for transmitting the data held in said storage device to said decoder.

2. The apparatus of claim 1, wherein said time information is a system clock reference time.

3. The apparatus of claim 1, wherein said reference time is a system time clock.

4. The apparatus of claim 1, wherein said decoder includes a decoding portion for decoding the data transmitted from said storage device with said time information and a time resetter for resetting said time information for decoding; and wherein said reset device resets said reference time simultaneously with the resetting of said time information in said decoder device.

5. A method for reproducing encoded data from a recording medium and transmitting the reproduced data to a decoder, comprising the steps of:

reproducing a plurality of data portions from said recording medium to provide reproduced data;

extracting time information included in said reproduced data, said time information including at least a start time and an end time for each of said reproduced data portions;

generating a reference time;

comparing said extracted time information to said reference time to generate a comparison result;

comparing an end time of one of said plurality of reproduced data portions and a start time of a next consecutive one of said plurality of reproduced data portions;

resetting said reference time when said end time of said one of said plurality of reproduced data portions is not equal to said start time of said next consecutive one of said plurality of reproduced data portions;

holding temporarily said reproduced data prior to transmission;

controlling the reproducing of data and the holding of data in accordance with said comparison result; and transmitting the temporarily held data to said decoder.

6. The method of claim 5, wherein said time information is a system clock reference time.

7. The method of claim 5, wherein said reference time is a system time clock.

8. The method of claim 5, wherein said decoder decodes the data transmitted thereto with said time information and resets said time information for decoding; and wherein said reference time is reset simultaneously with the resetting of said time information.

9. An apparatus for reproducing encoded data from a recording medium and transmitting the reproduced data to a decoding means for decoding, comprising:

reproducing means for reproducing a plurality of data portions from said recording medium to provide said reproduced data;

extraction means for extracting time information contained in said reproduced data, said time information including at least a start time and an end time for each of said reproduced data portions;

reference time generating means for generating a reference time;

first comparison means for comparing said extracted time information to said reference time to generate a comparison result;

second comparison means for comparing an end time of one of said plurality of reproduced data portions and a start time of a next consecutive one of said plurality of said reproduced data portions;

resetting means for resetting said reference time when said second comparison means determines that said end time of said one of said plurality of reproduced data portions is not equal to said start time of said next consecutive one of said plurality of reproduced data portions;

storage means for temporarily holding said reproduced data prior to transmission;

control means for controlling said storage means and said reproducing means in accordance with said comparison result; and transmission means for transmitting the data held in said storage means to said decoding means.

10. The apparatus of claim 9, wherein said time information is a system clock reference time.

11. The apparatus of claim 9, wherein said reference time is a system time clock.

12. The apparatus of claim 11, wherein said decoding means includes means for decoding the data transmitted from said storage device with said time information and means for resetting said time information for decoding; and wherein said means for resetting resets said reference time simultaneously with the resetting of said time information in said decoding means.

* * * * *